United States Patent Office 3,526,322
Patented Sept. 1, 1970

3,526,322
FILTER BODIES
Francis H. Burroughs, deceased, late of Mercer County, N.J., by Francis H. Burroughs, Jr., and Theodora M. Burroughs, coexecutors, Barrington, N.J., and Richard N. Zebrowski, Old Bridge, N.J., assignors to Star Porcelain Company, Trenton, N.J., a corporation of New Jersey
No Drawing. Filed Feb. 10, 1966, Ser. No. 527,398
Int. Cl. B01d 15/00, 39/20
U.S. Cl. 210—502
7 Claims

ABSTRACT OF THE DISCLOSURE

Absorbent filter bodies are provided containing molecular sieves and two additional absorbents chosen from the group of silica gel, activated alumina and attapulgus clay, the body being bonded by a glass frit.

---

This application relates to new and improved absorbent filter bodies and in particular to filter bodies which are highly adsorbent, porous and mechanically strong, and which can be made more economically than known bodies.

In the copending application of Francis H. Burroughs, Ser. No. 39,771, filed June 30, 1960, now U.S. Pat. 3,235,089, which application is a continuation-in-part of application Ser. No. 668,287, filed June 27, 1957, now abandoned, there are disclosed and claimed ceramic adsorbent filter bodies containing, as the effective adsorbent, activated alumina, molecular sieves or a mixture of those two materials. In accordance with the invention disclosed and claimed in said application, these active materials are bonded to form a useful body by means of a glass frit. The glass frit is found to provide high mechanical strength without adversely affecting the porosity or adsorbency of the active material.

The bodies made in accordance with the above copending applications have proved very satisfactory and are in commercial use. However, the relatively high cost of activated alumina and molecular sieves has made these bodies comparatively expensive so that there has developed a need for bodies having equivalent or superior qualities which could be made more economically. Moreover, different service requirements require optimization of different properties and this in turn requires a certain flexibility in formulating the body composition which cannot be obtained with the one or two adsorbent components of the prior application referred to.

It has been found that these requirements are met by means of a body containing molecular sieves and, as a secondary adsorbent, at least two of the group consisting of activated alumina, silica gel, and activated attapulgus clay. The body is bonded by means of an inert bonding material, preferably a fired glass frit of the general type disclosed in the prior application referred to.

Preferably bodies in accordance with the invention will contain, per 100 parts by weight of adsorbent, from about 5 to 70 parts of a fired glass frit. They may also contain per 100 parts of adsorbent up to about 15 parts of a processing adjuvant such as a clay whose function is primarily to aid in shaping the body.

The molecular sieves useful in this invention are alkali metal and alkaline earth metal zeolites or aluminosilicates which in the dehydrated condition maintain a crystal structure which affords a network of pores and cavities amounting to about 50% of the total crystal volume.

Typical molecular sieve compositions are illustrated by the following, which are manufactured by the Linde Company, a division of Union Carbide Corporation.

Type 4A:
$$0.96 \pm 0.04 Na_2O \cdot 1.00 Al_2O_3 \cdot 1.92 \pm 0.09 SiO_2 x H_2O$$

Type 5A:
$$0.72 \pm 0.03 CaO \cdot 0.24 \pm 0.01 Na_2O \cdot$$
$$1.00 Al_2O_3 1.92 \pm 0.09 SiO_2 \cdot x H_2O$$

Type 13X:
$$0.83 \pm 0.05 Na_2O \cdot 1.00 Al_2O_3 \cdot 2.48 \pm 0.03 SiO_2 \cdot x H_2O$$

"$x$" will of course vary with the degree of hydration of the sieve at any time. By activating the material at high temperature in a stream of very dry gas, $x$ can be reduced to zero.

Obviously other types of molecular sieves than those cited may be used as desired. Molecular sieves are normally obtained commercially as spheres or granules formed with 15–20% of an inert clay binder. The proportions stated here are stated on a binder-free basis.

The molecular sieves may comprise between about 15 and about 70% by weight of the total adsorbent in the fired body. Preferably it will not constitute more than about 50% by weight of the entire body, since proportions above that adversely affect flow rate or porosity.

The term "activated alumina" as used herein means a material consisting essentially of aluminum oxide and a small amount of combined water and characterized by its desiccant properties. Activated aluminas which are suitable for use in the present invention may contain some impurities. Examples of specific aluminas are Alcoa H and F grade actviated aluminas. H grade alumina contains a small amount of silica. A typical sample of H grade alumina, e.g., H–151, would consist of (by weight) 85% $Al_2O_3$, 2.0% $Na_2O$, 0.15% $Fe_2O_3$, 6.3% $SiO_2$ and 6.2% of material lost on ignition which is substantially all water. On the other hand F grade activated alumina as used herein is substantially all $Al_2O_3$ and combined water. A typical sample, e.g., F–1, might consist of 92% $Al_2O_3$, 0.80% $Na_2O$, 0.12% $Fe_2O_3$, 0.09% $SiO_2$ and 6.8% of material lost on ignition which is substantially all water.

Activated alumina is prepared by a controlled heating of aluminum hydrate [$Al(OH)_3$)]. In heating the hydrate the major portion of chemically combined water is driven off, and if the proper temperature is used, the resultant calcine has the ability to adsorb water from the ambient atmosphere, i.e., it becomes "activated." However, too high a calcination temperature destroys the adsorptive activity of the hydrate so that there is an optimum activation temperature at which the greatest activity results. The exact optimum temperature varies somewhat with the grade of aluminum hydrate employed. For example, the preferred temperature for F grade aluminum hydrate is in the range of 750° to 775° F., whereas the optimum temperature for H grade aluminum hydrate is about 850° F. while ordinarily any temperature in excess of these temperatures would be avoided, it is possible to heat the hydrate considerably above these temperatures without seriously reducing the activity of alumina. In fact it has been found that firing temperatures as high as 2,000° F. may be used without effectively destroying the desiccant properties of the alumina. Temperature in excess of 2,000° F. on the other hand, seriously reduce or completely destroy the activity of, or "dead-burn" the alumina.

In preparing bodies according to the invention, it is possible to use aluminum hydrate in the raw mix and to rely upon the firing of the body to activate the hydrate. Thus, for example, in place of using F-1 alumina, it is possible to use the corresponding hydrate, referred to as C-40 hydrate. F-1 is obtained by heating C-40 at 800° F. However, it is preferred to use an activated alumina in the initial mixture.

The activated alumina will preferably comprise between 0 and about 60% by weight of total desiccants in the fired body. Most preferably at least 7.5% alumina is used.

Silica gel is, of course, amorphous silica normally made by the dehydration of the jelly-like precipitate obtained when sodium silicate is acidified. It is readily obtained from various commercial sources.

The adsorbent attapulgus clay which is useful according to the present invention is a naturally occurring mineral found for example in southwestern Georgia and northwestern Florida. Prior to use it may be activated by heating to say 1800° F. to drive off water and other volatiles. Typically, though not invariably, it has the following moisture free composition, percent by weight:

| | |
|---|---|
| $SiO_2$ | 68.0 |
| $Al_2O_3$ | 12.0 |
| $MgO$ | 10.5 |
| $Fe_2O_3$ | 5.0 |
| $CaO$ | 1.7 |
| $P_2O_5$ | 1.0 |
| $K_2O$ | 1.0 |
| $TiO_2$ | 0.7 |
| Trace elements | 0.1 |
| | 100.0 |

While various grades of this material are available on the market, we prefer to use that sold under the designation "Attagel LVM."

The proportion of silica gel and activated attapulgus clay present in bodies according to the invention, considered individually, may each range from 0 to say 45% by weight of total adsorbent or desiccant. However, the total of silica gel and attapulgus clay is preferably at least 7.5% by weight based on total desiccant.

To summarize, bodies according to the invention will comprise, based on total adsorbent or desiccant, from 15 to 70% by weight molecular sieves, the balance consisting of at least two components of the group consisting of activated alumina, silica gel and activated attapulgus clay. A particularly advantageous range of proportions will comprise, on weight of total adsorbent, 25–45% molecular sieves, 25–52% activated alumina, 0–18% silica gel and 2.5–35% activated attapulgus clay.

The invention in its broadest sense embraces bodies in which the adsorbents or desiccants are bonded by any inert bonding medium. Clay is often conventionally used for this purpose. However, it is found that if clay is used in proportions sufficient to form a strong bond, the porosity and often the adsorbency of the body is adversely affected.

Other conventional bonding media, such as synthetic resins may be employed in special cases.

It is greatly preferred, however, to use a glass flux or frit to bond the adsorbents. This gives a very strong bond without adversely affecting either porosity or adsorbency.

The flux or glass frit used in the present invention may be chosen from any of the large number of such materials well known to the art having a maturing temperature between the activation temperature of the absorbent and the temperature at which the adsorbent becomes "dead-burned." Normally the flux or frit will have a maturing temperature of say 850° F. to 2,000° F. and will, at that temperature, provide a good ceramic bond with alumina.

Glasses or fluxes having these properties are readily compounded by those skilled in the art from mixtures of silica ($SiO_2$) and various combinations of the oxides of aluminum ($Al_2O_3$), boron ($B_2O_3$), sodium ($Na_2O$), potassium ($K_2O$), lithium ($Li_2O$), calcium ($CaO$), magnesium ($MgO$), barium ($BaO$), lead ($PbO$), and zinc ($ZnO$), among other elements. Some suitable fluxes are listed in Table I below:

TABLE I.—FLUX COMPOSITIONS

| | A | B | C | D | E | F |
|---|---|---|---|---|---|---|
| $SiO_2$ | 20.0 | 24.9 | 13.4 | 11.9 | 34.0 | 56.3 |
| $Na_2O$ | 6.4 | 1.5 | | | | 14.9 |
| $PbO$ | 59.2 | 71.2 | 72.2 | 88.1 | 65.0 | |
| $Al_2O_3$ | | 2.4 | | | 1.0 | |
| $B_2O_3$ | | 14.4 | | 9.0 | | 21.6 |
| $ZnO$ | | | | 5.4 | | |
| $CaO$ | | | | | | 7.2 |
| Melting point, ° F.* | 1,040 | 1,300 | 1,050 | 1,390 | 1,450 | 1,500 |

*The temperature given is the Pemco button melting point. However, the fluxes illustrated generally soften and become tacky at considerably lower temperatures. Thus composition A can be used at 900° F. to give a satisfactory bond.

Generally, the amount of flux used in the practice of the invention will be from about 5 parts to about 70 parts per 100 parts of adsorbent. With the preferred adsorbent composition referred to in column 3, between about 20 and about 45 parts frit per 100 parts of adsorbent may advantageously be used.

For proportioning purposes, where alumina is added as the hydrated, the weight is calculated as $Al_2O_3$.

In manufacturing bodies according to the invention, the adsorbent may simply be mixed with the flux or frit, shaped and fired at a temperature sufficient to mature the frit. A small amount of vehicle, such as water, may be used to give the raw unfired mix cohesiveness for shaping.

Preferably, however, because unfired agglomerates of glass frit particles and adsorbents do not easily adhere together by themselves, a processing adjuvant is provided which will enable the agglomerate to be molded into a body having the desired dimensions.

In choosing such an adjuvant it is important to select one which is effective in comparatively small concentrations because of the reduction in activity of the final product due to the presence of relatively inactive binding material. Bentonite has been proved satisfactory. Other adjuvants may be used such as carboxymethyl cellulose, the product sold on the market under the name "Veegum" produced by the R. T. Vanderbilt Co. or Eyrite, a mineral comprising chiefly calcium carbonate and magnesium silicate. However, normally the materials used are those which are effective in concentrations of not more than 15 parts by weight per 100 part of adsorbent, in addition to the adjuvant, a liquid vehicle is generally added. When bentonite is the adjuvant, water is the preferred vehicle, and is preferably used in concentrations of from 10 to 20 per 100 parts by weight of adsorbent.

The use of an adjuvant is also advantageous in permitting relatively low molding pressures to be used. Low molding pressures are in general preferred over higher pressures, because when higher pressures are used the body becomes more dense and compacted, thereby reducing the porosity, filtering rate and filtering capacity of the filter body. In general, the density of the finished filter body should be less than about 2.1 g./cc. Usually the blocks have a density of said 1–2 g./cc.

When all of the ingredients have been mixed together, i.e., the adsorbent, the flux or glass frit, and adjuvant, the mass may be molded into the desired shape by die-pressing in conventional dies. Another die-pressing procedure in the practice of this invention is a flexible die-pressing process known as "iso-static molding." This process is described in detail in the Benjamin A. Jeffrey Pat. No. 1,863,854 dated June 21, 1932, Re. 20,460 dated August 1937 and No. 2,251,454 dated Aug. 5, 1941.

In general, the required mold pressures are 200 p.s.i. or above. In general, at pressures below 200 p.s.i. the parts are too soft and difficult to handle. On the other hand, when the mold pressure exceeds 4000 p.s.i., the density is so great that the filter flow rate is cut too much. Preferably, the mold pressure should be between about 200 p.s.i. and about 2000 p.s.i.

After the filter body has been molded, it is fired at a temperature sufficient to fuse the flux or glass frit and provide a ceramic bond between the particles of alumina. This provides a strong composite body which has all the advantages of a porous filter in addition to desiccant properties.

Firing time is not critical and will be whaever is required to effect maturing of the particular frit employed. In conducting the firing the body is normally brought up to temperature as rapidly as the size and dimensions of the body and of the furnace will permit. This may be, for example, on the order of ½ to 5 hours. The body is held at temperature (soaked) for a period of 10 minutes or greater, and periods as long as 24 hours have given good results. After maturing the body is left to cool gradually over a period of say 2 to 24 hours.

In the following examples, the samples were brought up to temperature in about 4¼ hours, held at temperature for an hour and cooled to room temperature over a period of about 12 hours. It will be understood that any heating cycle which will mature the particular frit being used, may be employed.

EXAMPLE 1

A series of batches were made up containing 28 parts by weight molecular sieves (Davison Microtrap 8–12 mesh spheres containing about 15% inert binder), 24 parts of Flux A (100 mesh), 8 parts bentonite and varying proportions of activated alumina (F-1, 14–28 mesh), silica gel Davison 408, 12–28 mesh) and activated attapulgus clay (Attagel LVM 12–28 mesh). One part of carboxymethyl cellulose was added to improve molding properties. The material was dry blended and then approximately 20 parts by weight of water were added slowly. The pasty mixture was pressed in steel molds at 1000 p.s.i. to form test bodies, which were dried at 230° F. for 16 hours and then fired at 1100° F. The bodies were then tested for compressive strength, adsorption (low humidity and high humidity) and flow rate.

In determining adsorption, the total percent increase in weight was measured on bodies 1.14" diameter x ½" long, after 5 days exposure at room temperature to 3.2% relative humidity (low RH) and 100% relative humidity (high RH), respectively.

Flow rate was determined as the gallons per minute of Freon 12 capable of flowing through specimens 2½" diameter x 1" long, under 2 p.s.i. pressure.

The results are reported in Table A below:

TABLE A

| Body | Percent by weight of total adsorbent* | | | Adsorption, percent | | Flow rate, g.p.m. | Comp. strength, p.s.i. |
|---|---|---|---|---|---|---|---|
| | Activated alumina | Silica gel | Att. clay | Low RH | High RH | | |
| 1 | 50.2 | 0 | 8 | 1.52 | 16.3 | .32 | 2,460 |
| 2 | 50.2 | 11.8 | 0 | 1.48 | 15.9 | .53 | 2,200 |
| 3 | 37.6 | 0 | 23.6 | 1.43 | 15.9 | .23 | 2,830 |
| 4 | 37.6 | 11.8 | 11.8 | 1.43 | 15.9 | .63 | 2,440 |
| 5 | 37.6 | 23.6 | 0 | 1.76 | 15.8 | .58 | 1,710 |
| 6 | 25.1 | 0 | 35.2 | 1.20 | 14.0 | 0 | 2,060 |
| 7 | 25.1 | 11.8 | 23.6 | 1.41 | 15.4 | .16 | 2,120 |
| 8 | 25.1 | 23.6 | 11.8 | 1.39 | 16.2 | .58 | 1,350 |
| 9 | 25.1 | 35.2 |  | 1.41 | 16.3 | 1.27 | 1,530 |
| 10 | 12.5 | 0 | 47 | 1.08 | 14.4 | 0 | 2,720 |
| 11 | 12.55 | 11.8 | 35.2 | 1.52 | 15.5 | .21 | 1,350 |
| 12 | 12.5 | 23.6 | 23.6 | 1.72 | 13.7 | .33 | 1,520 |
| 13 | 12.55 | 35.2 | 11.8 | 1.47 | 16.6 | .49 | 1,600 |
| 14 | 12.5 | 47 | 0 | 1.39 | 16.9 | .63 | 1,440 |
| 15 | 0 | 25.1 | 37.6 | 1.30 | 16.3 | 0 | 1,910 |
| 16 | 0 | 37.6 | 25.1 | 1.75 | 16.9 | .21 | 1,800 |
| 17 | 0 | 50.2 | 12.5 | 1.33 | 16.6 | .80 | 1,130 |

*In computing total adsorbent, 15% by weight of the molecular sieve composition was excluded as comprising inert material.

EXAMPLE 2

A second series of runs was made as in Example 1, using no clay binder but adding 2 parts of carboxymethyl cellulose to aid in molding. In these runs the proportions of adsorbent and flux were varied and the adsorbent composition itself was varied. A four component adsorbent system was used comprising varying proportions of molecular sieves and a secondary adsorbent component which in all cases contained equal proportions of activated alumina (F-1), silica gel and activated attapulgus clay (Attagel LVM). The molecular sieves in all cases were a mixture of Davison Microtrap 8–12 mesh spheres and 14–28 mesh granules. The weight proportion of granules to spheres was selected so that up to 28% on the weight of the body, consisted entirely of spheres, where the total molecular sieves exceeded 28% (15% of this 28% represents inert materials), the excess was used in the form of granules. The results are shown in Table B.

TABLE B

| Body | Body composition, percent by weight | | | Adsorbent composition, percent weight of total desiccant | | Adsorption, percent | | Flow rate, g.p.m. | Comp. strength, p.s.i. |
|---|---|---|---|---|---|---|---|---|---|
| | Flux | Mol. sieves [1] | Sec. adsorbent | Mol. sieves [2] | Sec. adsorbent | Low RH | High RH | | |
| 1 | 30 | 60 | 10 | 83.6 | 16.4 | 1.14 | 15.1 | [3] E.S. | 1,690 |
| 2 | 30 | 50 | 20 | 68.0 | 32.0 | 1.19 | 14.2 | 0.42 | 1,270 |
| 3 | 30 | 40 | 30 | 53.1 | 49.9 | 0.68 | 15.8 | 0.40 | 1,340 |
| 4 | 20 | 40 | 40 | 46.0 | 54.0 | 1.22 | 16.4 | 0.71 | 990 |
| 5 | 10 | 40 | 50 | 40.5 | 59.5 | 1.40 | 13.6 | 0.49 | 700 |
| 6 | 5 | 40 | 55 | 38.3 | 61.7 | 1.66 | 22.6 | | 290 |
| 7 | 30 | 30 | 40 | 38.9 | 61.1 | 0.82 | 15.7 | 0.35 | 1,320 |
| 8 | 40 | 20 | 40 | 29.8 | 70.2 | 0.43 | 13.8 | 0.16 | 2,720 |
| 9 | 30 | 20 | 50 | 25.4 | 74.6 | 0.68 | 15.9 | 1.06 | 1,320 |
| 10 | 15 | 25 | 60 | 26.2 | 73.8 | 0.75 | 18.7 | 0.53 | 780 |
| 11 | 35 | 10 | 55 | 13.4 | 86.6 | 0.63 | 14.0 | 1.18 | 2,260 |
| 12 | 30 | 10 | 60 | 12.4 | 87.6 | 0.77 | 14.5 | 0.21 | 1,320 |

[1] Includes approximately 15% inert material. [2] Inert material excluded in this computation. [3] Extremely slow.

EXAMPLE 3

Example 2 was repeated except that in this case the secondary adsorbent contained equal parts of Attagel LVM and silica gel (activated alumina omitted). The results are shown in Table C.

TABLE C

| Body | Body composition, percent by weight | | | Desiccant composition, percent by weight of total adsorbent | | Adsorption, percent | | Flow rate, g.p.m. | Comp. strength p.s.i. |
|---|---|---|---|---|---|---|---|---|---|
| | Flux | Mol. sieves[1] | Sec. adsorbent | Mol. sieves[2] | Sec. adsorbent | Low RH | High RH | | |
| 1 | 30 | 42.5 | 62.5 | 68.0 | 32.0 | 1.01 | 14.4 | [3] E.S. | 2,400 |
| 2 | 30 | 34 | 64 | 53.1 | 46.9 | 0.94 | 15.2 | 0.42 | 1,280 |
| 3 | 20 | 34 | 74 | 46.0 | 54.0 | 0.91 | 15.3 | 0.35 | 790 |
| 4 | 10 | 34 | 84 | 40.5 | 59.5 | 0.88 | 20.7 | 0.46 | 330 |
| 5 | 5 | 34 | 89 | 38.3 | 61.7 | 0.54 | 21.0 | | 200 |
| 6 | 30 | 25.5 | 65.5 | 38.9 | 61.1 | 0.84 | 14.2 | 0.71 | 1,190 |
| 7 | 40 | 17 | 57 | 29.8 | 70.2 | 0.81 | 12.8 | 0.27 | 2,300 |
| 8 | 30 | 17 | 67 | 25.4 | 74.6 | 0.55 | 15.3 | 0.46 | 1,200 |
| 9 | 15 | 21.3 | 81.3 | 26.2 | 73.8 | 0.92 | 18.2 | 0.63 | 700 |
| 10 | 35 | 8.5 | 63.5 | 13.4 | 86.6 | 0.90 | 13.1 | 0.35 | 2,040 |
| 11 | 30 | 8.5 | 68.5 | 12.4 | 87.6 | 0.76 | 12.9 | 0.58 | 960 |

[1] Includes approximately 15% inert material.  [2] Inert material excluded.  [3] Extremely slow.

What is claimed is:

1. A composite adsorbent filter body comprising a particulate adsorbent material, the particles of which are fused together by a glass frit, said adsorbent material comprising between about 15 and about 70% by weight molecular sieve, the balance of the adsorbent material comprising activated alumina and activated attapulgus clay, the proportion of activated alumina being less than about 60% and that of activated attapulgus clay being between about 7.5% and about 45%, based on total weight of adsorbents, there being between about 5 and about 70 parts by weight of glass frit binder, per 100 parts of adsorbent.

2. The body claimed in claim 1 and comprising between about 25 and about 45% molecular sieves, between about 25 and about 45% activated alumina and between about 7.5 and about 35% activated attapulgus clay, based on the total weight adsorbents.

3. The body claimed in claim 1 wherein the glass frit has a maturing temperature between about 850° F. and about 2000° F.

4. The body claimed in claim 3 and comprising between about 20 and about 45 parts of fired glass frit, per 100 parts of adsorbent.

5. The body claimed in claim 1 wherein at least 7.5% of the total weight adsorbent is activated alumina.

6. The body claimed in claim 1 and comprising a processing adjuvant, said adjuvant being present in a proportion not exceeding 15 parts, per 100 parts of adsorbent.

7. The body claimed in claim 6 wherein the adjuvant is bentonite.

References Cited

UNITED STATES PATENTS

| Re. 25,464 | 10/1963 | Duke et al. | 210—502 X |
| 2,000,777 | 5/1935 | Minton | 210—510 |
| 2,008,327 | 7/1935 | Kuppinger | 210—510 X |
| 2,292,632 | 8/1942 | Greger | 210—502 X |
| 2,324,079 | 7/1943 | Greger | 210—502 X |
| 3,025,233 | 3/1962 | Figert | 210—504 X |
| 3,091,550 | 5/1963 | Doying | 55—389 X |
| 3,170,872 | 2/1965 | Balogh et al. | 210—446 X |
| 3,181,231 | 5/1965 | Breck | 210—503 X |
| 2,973,327 | 2/1961 | Mitchell et al. | 55—389 X |
| 3,006,153 | 10/1961 | Cook | 55—389 X |
| 3,235,089 | 2/1966 | Burroughs | 210—510 |

JAMES L. DE CESARE, Primary Examiner

U.S. Cl. X.R.

55—389; 210—510